Sept. 27, 1966   D. DUHL   3,274,806
FABRIC CONTAINING ELASTOMERIC FILLER AND METHOD
Filed April 20, 1964   4 Sheets-Sheet 1

INVENTOR.
DANIEL DUHL
BY
his ATTORNEYS

Sept. 27, 1966 D. DUHL 3,274,806
FABRIC CONTAINING ELASTOMERIC FILLER AND METHOD
Filed April 20, 1964 4 Sheets-Sheet 2

INVENTOR.
DANIEL DUHL
BY Brumbaugh, Free,
Graves + Donohue
his ATTORNEYS

INVENTOR.
DANIEL DUHL

Sept. 27, 1966 D. DUHL 3,274,806
FABRIC CONTAINING ELASTOMERIC FILLER AND METHOD
Filed April 20, 1964 4 Sheets—Sheet 4

INVENTOR.
DANIEL DUHL
BY
his ATTORNEYS

United States Patent Office 3,274,806
Patented Sept. 27, 1966

3,274,806
FABRIC CONTAINING ELASTOMERIC
FILLER AND METHOD
Daniel Duhl, New Hyde Park, N.Y., assignor to Indian Head Mills, Inc., New York, N.Y., a corporation of Massachusetts
Filed Apr. 20, 1964, Ser. No. 361,619
10 Claims. (Cl. 66—192)

This invention relates to a novel stretchable fabric and to a method of preparing the same.

This application is a continuation-in-part of my co-pending application, Serial Number 301,059, filed August 9, 1963.

Extensive use is being found in the apparel industry for thin sheets of elastomeric foam, made either from natural rubber or synthetic plastic materials. Foamed polyurethane, for example, is used in cold weather garments where it is generally combined with layers of conventional fabrics forming inner and outer protective covering for the sheet of foam. In this type of structure, the fabric layers have been attached to the foam by loose and spaced-apart quilting stitches.

Considerable interest has also been shown in bonded fabrics, where a layer of a conventional fabric is bonded to a thin sheet of elastomeric foam to form a composite fabric having the limited extensibility and hard exterior surface of the conventional fabric and the insulating properties of the foam layer.

While the bonded laminates of fabric and elastomeric foam are useful for certain purposes, they have had some limitations. The interposition of an adhesive between the foam and fabric layers creates problems both in processing and in the end use of the fabric. For example, extreme care must be observed in the selection of a suitable adhesive, and in the application thereof to the foam to insure proper bonding in order that the flexibility and insulating properties of the foam are retained. Also, the extensibility of a laminate of this type is limited by the stretch properties of the fabric portion of the laminate and by the nature of the adhesive used.

The elastomeric foams presently available are somewhat fragile and difficult to handle in the thicknesses ordinarily used for clothing purposes. It is recognized that polyurethane foams tear rather easily. Also, whether the foam is bonded to a conventional fabric by adhesive, or loosely joined therewith, as by the quilting of a multiple structure, the resulting fabric has a hand which is more characteristic of the foam than of the fabric joined with it.

It is an object of this invention ot provide a fabric which utilizes the stretch characteristics of elastomeric foam sheets and which, at the same time, limits the extensibility of the foam at a point short of rupture thereof.

Another object of this invention is to provide a stretch fabric without recourse to expensive crimped yarns.

Still another object of this invention is to provide a novel method of preparing a stretch fabric. These and other objects of the invention will appear from the following description and the accompanying drawings.

It has now been found that a fabric structure meeting the objects of this invention can be prepared by providing a sheet of elastomeric foam and by knitting into the sheet an extension-limiting yarn system comprising a plurality of closely spaced rows of thread, each row being knitted through the sheet to form a row of interconnected loops on the opposite surface thereof. In this manner, the elastomeric foam, in effect, is encased within the yarn system.

The extension-limiting yarn system is formed from a yarn or thread which itself is substantially nonextensible. The yarn system may be provided by rows of thread in the form of a double thread lock stitch or a chain stitch, but in that event, a transverse reinforcing yarn must be used to prevent the foam sheet from breaking when the fabric is stretched in a transverse direction. The preferred extension-limiting yarn system is provided by rows of thread in the form of a tricot stitch.

A full tricot stitch through the foam sheet is difficult to accomplish on a large scale with existing equipment and the most preferred extension-limiting yarn system is a half tricot stitch.

Tricot constructed clothes are generally made with two guide bars feeding yarn to needles. In making a full tricot stitch, each guide bar feeds yarn to the needles. The back bar first forms a closed tricot stitch using two needles. The front bar at the same time forms a closed tricot stitch across three needles. The two bars working simultaneously form what is known as a full tricot stitch. This structure is shown in FIG. 7 of the drawings.

In forming a half tricot stitch as shown in FIGS. 1 and 2 of the drawings, only one guide bar is used and this guide bar forms a closed tricot stitch using two needles. This arrangement is considered to be equivalent to the back bar of the apparatus used in forming a full tricot stitch and the stitch obtained using only one guide bar is therefore called a half tricot stitch. It should be noted that the half tricot stitch is a closed stitch.

The half tricot stitch forms closely spaced rows of loops on one surface of the elastomeric sheet, the thread passing through the sheet and forming a zig-zag line on the other surface of the sheet. The zig-zag line represents a single 1 x 1 warp, in which two ends lap obliquely in opposite directions. The chains of loops and the courses of loop chains are thereby joined with each other.

The fabric construction thus provided utilizes the extensibility of the elastomeric foam sheet, but provides a limit of extension at a point prior to rupture of the elastomeric sheet. In order to exceed this limit, the yarn system must be broken. At the same time, the yarn system provides a protective layer of thread on both sides of the sheet. The sheet of foam is integrated with the thread of the yarn system ot produce a single ply coherent product having essentially the hand or drape of a knitted fabric and retaining the insulating properties of the foam. As an additional advantage, where thermoplastic yarns, such as nylon, are used as the thread with sheets of a foam, such as polyurethane, the resulting fabric structure is moldable under the influence of heat and pressure to form a molded foam product. Molding of the polyurethane foam sheet itself cannot be accomplished by presently known technology.

A preferred fabric according to this invention is obtained where the extension-limiting yarn system is applied to the sheet of elastomeric foam while the sheet is in a stretched condition. This is accomplished by stretching a continuous sheet of the elastomeric foam in a linear direction, a preferred degree of stretch being about 40%. The extension-limiting yarn system is knitted into the stretched sheet, the closely spaced rows being oriented parallel to the direction in which the sheet is stretched. The sheet is then allowed to contract in recovery from its stretched condition. The limit of extensibility in the linear direction is thus fixed at approximately 40%, where a tricot yarn system is applied. Because of the interconnecting warp lap segments between adjacent rows of the tricot yarn system, an extension limit is imposed on stretch of the fabric in the transverse direction.

While the preferred degree of stretch applied to the elastomeric foam in a linear direction is 40%, it is recognized that is merely representative and can be varied in accordance with the requirements of the breaking point of the sheet of elastomeric foam used. This procedure also provides a means whereby the degree of stretch imparted to the final fabric may be controlled.

In this regard, it should be noted that when a chain stitch is applied to an elastomeric foam sheet in its stretched condition and the product is subsequently permitted to relax, the foam does not retain the full amount of yarn applied thereto because of slippage of the yarn through the foam. The tricot stitch system, on the other hand, permits all of the yarn applied to the stretched foam to be carried into the relaxed product. The tricot stitch system, therefore, permits the imposition of a predictable extensibility limit on the elastomeric foam sheet, and this is one of the reasons why it is preferred.

In a still further embodiment of this invention, a facing of laid in yarn or of a preformed fabric is interposed between the foam sheet and the extension-limiting yarn system. Yarn is laid in on the elastomeric foam sheet and secured thereto by the application of the extension-limiting yarn system. This is preferably accomplished by stretching a continuous sheet of the elastomeric foam in a linear direction, superimposing a laid in yarn on the upper surface of the stretched sheet with the yarn oriented at a substantial angle, preferably perpendicular, to the direction of stretch, and by securing the laid in yarn to the stretched sheet by application thereto of an extension-limiting yarn system comprising closely spaced rows of thread, each row being knitted through the laid in yarn and sheet to form, in the case of a half tricot stitch, a row of interconnecting loops on the upper surface of the fabric parallel to the direction in which the sheet is stretched and a zig-zag line of thread on the underside.

Where a preformed fabric is used as a facing for the elastomeric foam sheet, the continuous sheet of elastomeric foam is stretched in a linear direction, the preformed fabric is superimposed on one surface of the sheet, and the fabric is secured to the sheet by application of an extension-limiting yarn system in the manner described above. The elastomeric foam sheet is then permitted to relax. Depending upon the type of preformed fabric used, the fabric will either cause some degree of puckering, or the threads thereof will slip over each other to form a smooth unpuckered surface. The latter result is generally desired, and the use of a tricot cloth, for example, as the preformed fabric, will provide such an unpuckered smooth surface.

In addition, a backing of laid in yarn or of a preformed fabric may, if desired, be applied to the underside of the elastomeric foam sheet. In the event a facing, a backing or both are used, they are secured to the elastomeric foam sheet by the extension-limiting yarn system.

The flexible elastomeric foam sheet which may be used according to this invention includes those foams customarily made for use with fabrics and as insulation for various articles of apparel. The sheets should be resilient, and at the same time, resistant to tearing when pierced by sewing needles. Sheets of foam rubber and foamed synthetic materials, such as polyurethane, may be employed. Other suitable materials include cellular products made from polymers of butadiene or of butadiene and styrene, reaction products of polysulfide salts and polyhalides, polymers formed from halogenated unsaturated hydrocarbons, isobutylene polymers, polymeric vinyl halides, polyamides, polyesters and polyureas.

The sheets of elastomeric foam may be used in thicknesses varying from about 1/32 of an inch to 1/2 inch or more, depending upon the end use to which the fabric is to be put. One preferred thickness for polyurethane foam used according to this invention is 5/64 of an inch. Continuous sheets of elastomer are available in varying widths. A conventional width for polyurethane foam is 68 inches, and other widths range from 45 to 78 inches. Selection of an appropriate width will depend upon the dimension of the apparatus used to make the fabric.

The facing applied to the elastomeric sheet in accordance with this invention may comprise parallel or substantially parallel bundles of laid in yarn. It is also desirable in some instances to utilize a preformed fabric, preferably a tricot cloth, in which the loops slip over each other when the stretched foam relaxes forming a smooth, unpuckered fabric, and extensible to the limit of the loops as originally applied. Suitable laid in yarns include cotton, wool, nylon, acrylic, mohair, or other desired natural or artificial fiber yarns. One suitable acrylic yarn comprises about 50% of 10 singles of a blend of acrylic, rayon and nylon, and 50% of 14 singles acrylic yarn. Suitable preformed fabrics are lace, tricot or other fabric, the structure of which allows compression of fabric with minimum puckering.

A facing yarn, after being secured to the sheet of foam, may be napped in any suitable manner to provide a napped surface effect on the fabric. Where the napping severely diminishes the strength of the laid in yarn, which, with stitch lengths greater than 1.5 millimeters, would allow the fabric to tear in transverse direction, it is preferable to include a strong yarn such as nylon in the laid in yarn in addition to the yarn to be napped. It is also important that this reinforcing yarn be placed immediately adjacent to the surface of the foam sheet and that the yarn to be subsequently napped be laid on over the reinforcing yarn so that during the napping operation, substantially only the upper layer of yarn is napped, leaving the reinforcing yarn intact.

One suitable method of laying in two separate layers of laid in yarn involves the use of a carriage which moves back and forth in a transverse direction and is designed to lay down two layers of laid in yarn. The forward half of the carriage is supplied with reinforcing yarn while the rearward half of the carriage is supplied with bulky yarn which is designed to be subsequently napped. In passing once across the width of the pin tenter chains designed to carry the yarn to the stretched sheet of foam, two strips of equal width of each of the yarns are laid in by the carriage. During the return of the carriage across the width of the pin tenter chains, the forward motion of the apparatus which carries the laid in loops of yarn, causes the next strip of reinforcing yarn to be laid in over the strip of previously laid in bulky yarn. At the same time, a new strip of bulky yarn is laid in. The carriage continues its passage back and forward across the width of the sheet, with the result that two separate distinct layers of the two yarns are laid in. The composite of laid in yarns is then applied to the surface of the stretched foam sheet with the reinforcing yarn immediately adjacent to the surface of the foam. The extension-limiting yarn system is then applied through the foam sheet to secure the laid in yarn thereto.

Where a half tricot stitch is used as the extension-limiting yarn system to secure the laid in yarn to be subsequently napped, it is important that the yarn be secured by the rows of loop chains rather than by the rows of zig-zag line of threads. In the latter event, the napping operation damages the extension-limiting yarn system, and an unsatisfactory product results.

The thread used in the extension-limiting yarn system of the fabric structure of this invention may be nylon, rayon, cotton, wool, linen, Dacron, and the like. It may be monofilament or multifilament, and may range in denier from 15 to 1,000, or more. In addition, it must have a breaking strength in excess of that of the foam sheet. A preferred yarn is a nylon yarn of about 100 denier.

In practicing this invention, consideration must be made to both the stitch length and the number of wales of chains of loops employed in the extension-limiting yarn system. The latter variable is more conveniently referred to as gauge, the gauge number being the same as the number of wales of chains of loops per inch. It has been found that a stitch length shorter than about 1.5 millimeters causes so many perforations to be made in the elastomeric foam sheet that the strength thereof is severely reduced.

and in extreme cases, the elastomeric foam sheet is actually severed to form longitudinal strips. A similar problem is encountered where more than 18 wales per inch are applied (18 gauge), causing severed transverse strips of foam.

When the sheet of elastomeric foam alone is incorporated within the extension-limiting yarn system, a stitch length greater than about 2.0 millimeters provides an excessive amount of extension-limiting yarn to the fabric, thus increasing the extensibility of the fabric beyond the breaking point of the foam sheet where about 18 wales to the inch are used. Where about 14 wales to the inch are used, a stitch length of no more than about 1.5 millimeters can be employed. The longer stitch lengths, i.e., those in excess of about 2.0 millimeters with 18 gauge, and those in excess of about 1.5 millimeters with 14 gauge, permit the fabric to be stretched beyond the tear limit of the foam in the transverse direction.

Where, on the other hand, a laid in yarn or preformed fabric layer is applied to one or both surfaces of the elastomeric foam sheet, a stitch length of up to 3.5 millimeters or more can be used, as extension limitations imposed by the laid in yarn or fabric protect the foam from excessive stretching in the transverse direction.

The above limits of wales per inch, and of stitch length have been determined with respect to polyurethane foam having a thickness of 5/64 of an inch and with 100 denier nylon and 15/1 cotton yarns. The limits will vary, depending upon the strength and other properties of the specific elastomeric foam sheet employed, and where the yarns used are of a different nature. The various considerations given will enable one skilled in the art to readily determine the limits for a given combination of materials.

The fabrics of this invention may be made in any apparatus used by those skilled in the art to apply closely spaced parallel rows of chain stitching, lock stitching or tricot stitching to a continuous web. One preferred apparatus which can be used in preparing the fabrics of this invention is that disclosed in the U.S. Patent No. 3,030,786 to H. Mauersberger. Another suitable apparatus is the Arachne unit, made by Kovo of Prague, Czechoslovakia.

In accordance with one embodiment of my invention, where preformed fabrics are to be applied to one or both surfaces of the stretched elastomeric foam sheet, the foam is stretched, the preformed fabric is applied to the surface of the stretched foam and is immediately stitched. In practice, the elastomeric foam sheet is brought to a stretched condition by adjustment of relative feed rates. For example, assuming a production rate of completed fabric of 1 yard per minute, the preformed fabric is presented to the stitching machine at the rate of 1 yard per minute while the foam sheet is presented at the rate of ½ yard per minute. The two sheets are brought together at the point where the needles pierce the composite fabric.

The invention will be further described with reference to the accompanying diagrammatic drawings, in which.

Figure 1:
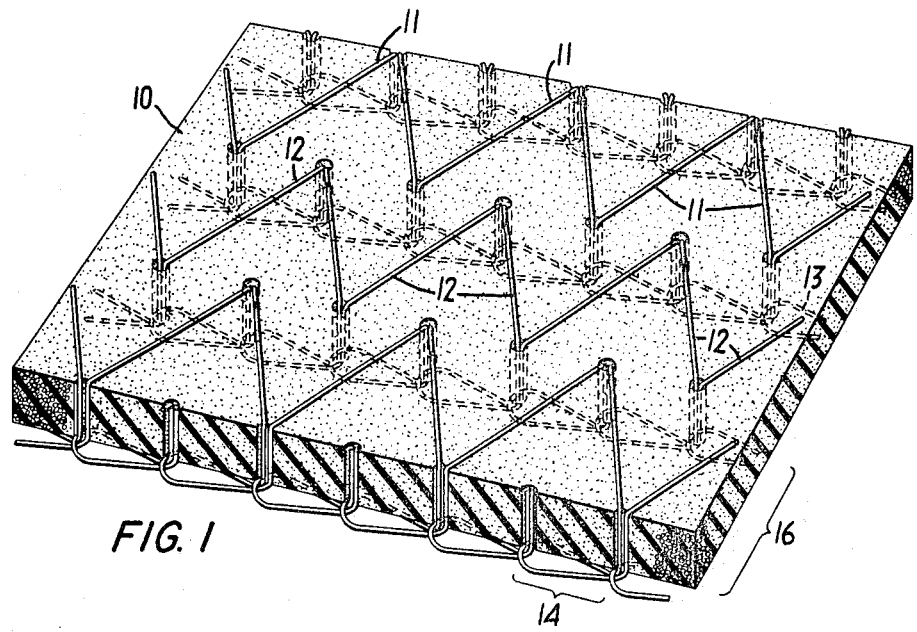
FIG. 1 shows an enlarged perspective, partly in section, of the fabric of the invention, extensible only in the transverse direction.
Figure 2:
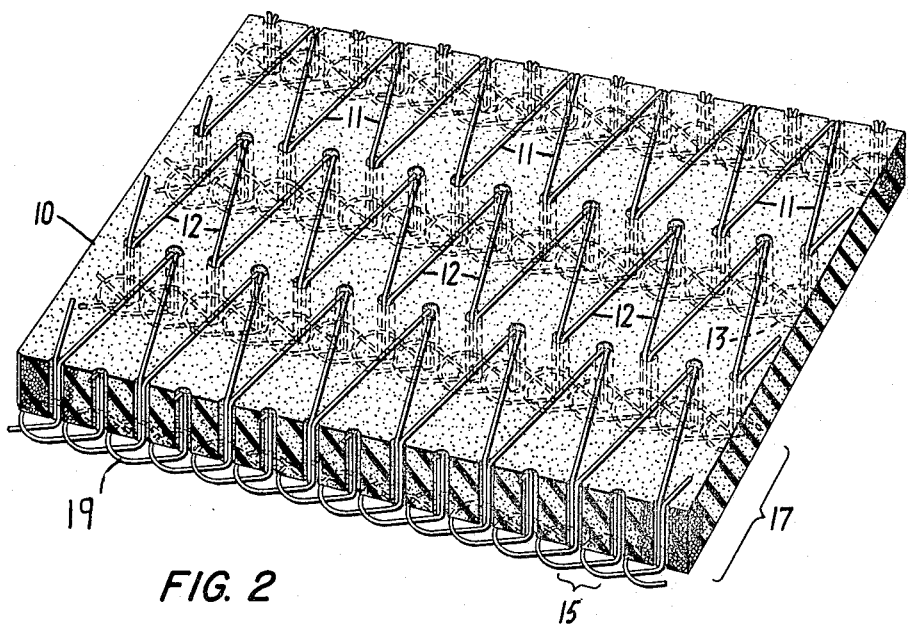
FIG. 2 shows the relaxed form of another embodiment of the invention, where the foam is stretched in one direction during the fabrication thereof.

Referring to FIG. 1 and FIG. 2, a structure is described comprising a sheet of polyurethane foam 10 to which has been applied an extension-limiting yarn system using an apparatus as described in the Mauersberger patent identified above. The yarn system comprises threads 11 and 12 which are passed through sheet 10 to alternately form the loops of chain 13. In the view given, each of threads 11 and 12 form a zig-zag path on the upper surface of foam sheet 10, and parallel to the chain 13 on the underside of the sheet 10, in the manner of a half tricot stitch.

In the embodiment shown in FIG. 1, the distance 14 between stitches is the stitch length; the optimum length for the embodiment shown is 1.5 millimeters. FIG. 1 shows, in relaxed condition, the fabric obtained with the normal operation of the machine where from 5–10% stretching of the sheet occurs during the feeding step. The distance 16 between wales of loop chains is governed by the gauge of the machine. A preferred value is 14 gauge, which means 14 wales of loops per inch are applied to the foam sheet 10.

FIG. 2 represents, in the relaxed state, the embodiment of this invention wherein the stitches are formed through the foam sheet 10 while the sheet 10 is in a stretched condition. In the embodiment illustrated, the sheet is stretched approximately 40% prior to the stitching operation, so that, on relaxing, the distance 15 between stitches is approximately half that of distance 14 in FIG. 1. Distance 17 again refers to the distance between wales of loop chains and is governed by the gauge of the machine.

It will be noted that the loops 19 in the embodiment of FIG. 2 are moved up onto each other as compared with the loops of chain 13 of FIG. 1. This feature accounts for the increased extensibility of the fabric represented by FIG. 2.

Figure 3:
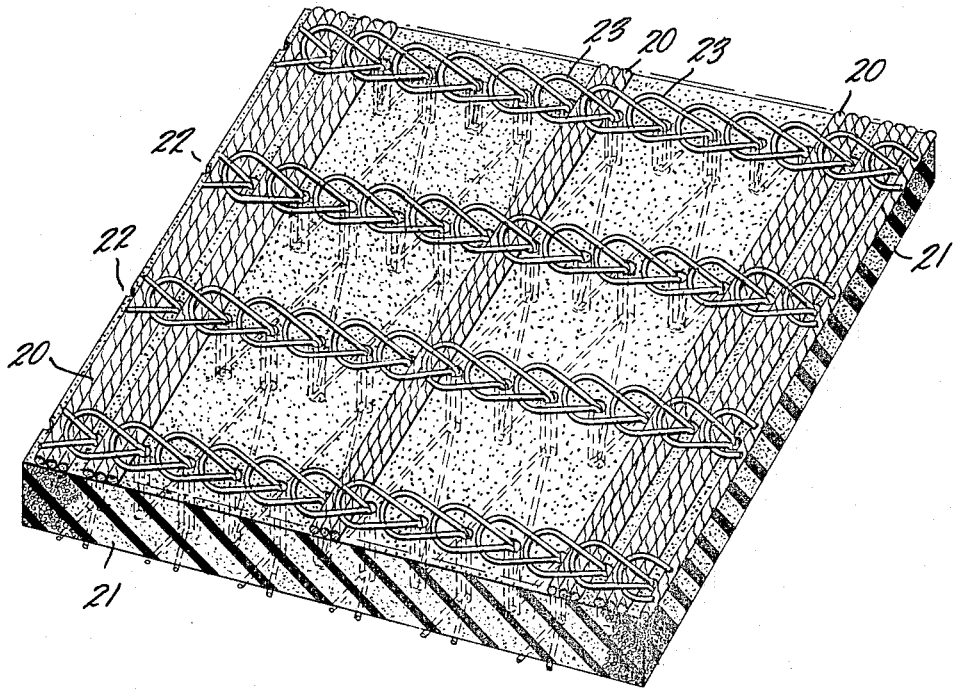
FIG. 3 is an enlarged perspective showing the embodiment of the invention wherein laid in yarn is superimposed on the surface of the foam sheet.

FIG. 3 shows the embodiment of this invention including parallel laid in yarn 20 superimposed on an elastomeric foam sheet 21 and secured thereto by an extension-limiting yarn system comprising the loops 23 of parallel chains of loops 22 of a half tricot stitch. Three strands of yarn 20 are shown in the drawing as being secured by each loop. The number of strands secured by each loop 23 can be varied, of course, depending upon the thickness of the yarn 20 an the effect desired for the facing of the sheet. In the embodiment shown, the yarn 20 is laid on perpendicular to the loop chains 22 and when comprising substantially unyielding yarns, they effectively prevent substantial stretching of the fabric structure in a transverse direction. Thus, the fabric structure shown in FIG. 3 will stretch only in a linear direction, that is, in the direction of the loop chains 22.

Figure 4:
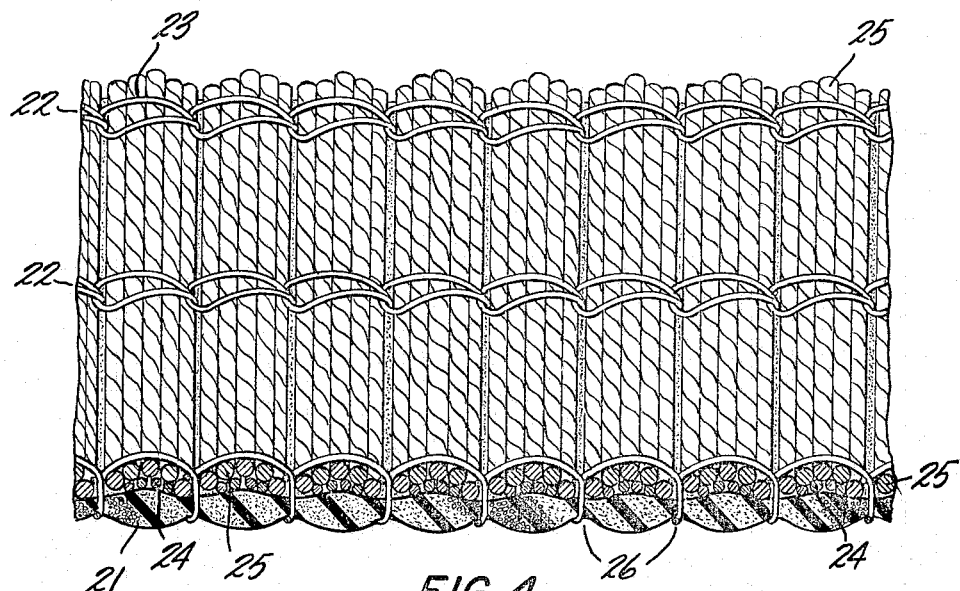
FIG. 4 is an enlarged top view, partly in section, showing two separate layers of laid in yarn and an approximation of the structure obtained when the foam is stretched during fabrication thereof and thereafter relaxed.

FIG. 4 shows, in relaxed condition, the structure of an embodiment of this invention wherein two distinct layers of yarn are laid in a direction transverse to the sheet and perpendicular to the loop chains 22. During the preparation of this embodiment, the elastomeric foam sheet 21 is stretched approximately 40%. A reinforcing laid in yarn 24 and a bulkier laid in yarn 25 are simultaneously superimposed on the foam sheet 21 in its stretched condition, the yarn running in a direction perpendicular to the direction in which the sheet 21 is stretched. The laid in yarn is secured to the sheet 21 by an extension-limiting yarn system in the form of closely spaced parallel rows of tricot stitches 22. The interconnected loops 23 thereof separately secure a plurality of the laid in yarns 24 and 25, and the structure is permitted to relax. In the embodiment shown in FIG. 4, both the extension-limiting yarn system 22 and the foam sheet 21 are maintained under slight positive tension, as indicated by the depressions 26 in the under surface of the foam sheet 21.

Figure 5:
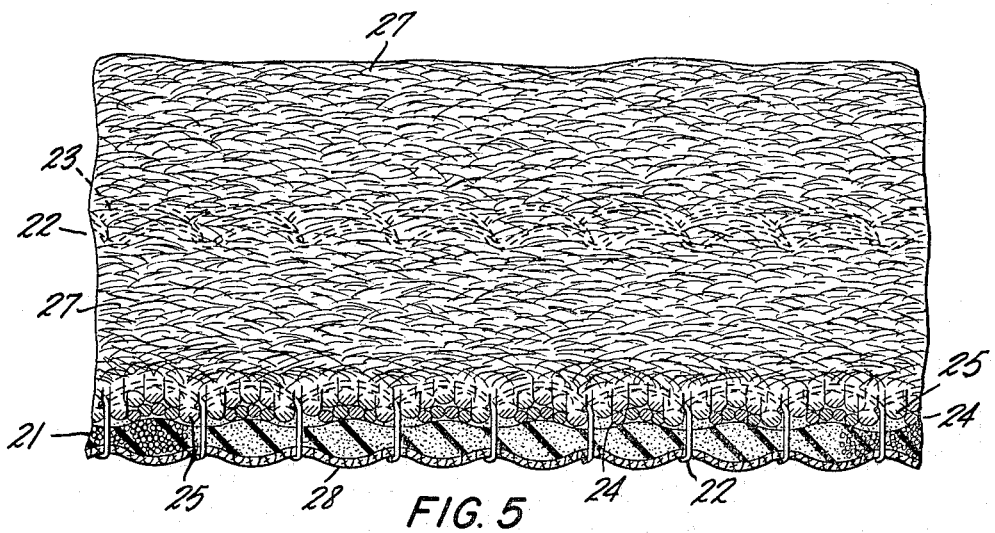
FIG. 5 is as FIG. 4, except that the laid in yarn is napped.

FIG. 5 illustrates the above described embodiment of FIG. 4 after the bulky laid in yarn 25 has been napped to provide a surface layer of fibers 27 on the fabric structure. The elastomeric foam sheet 21 of FIG. 5 is also provided with a preformed tricot fabric backing 28 on the bottom surface thereof. Backing 28 is secured to the fabric structure by incorporation within the extension-limiting yarn system 22. Note that the reinforcing yarn 24 remains substantially intact after the napping operation.

Figure 6:
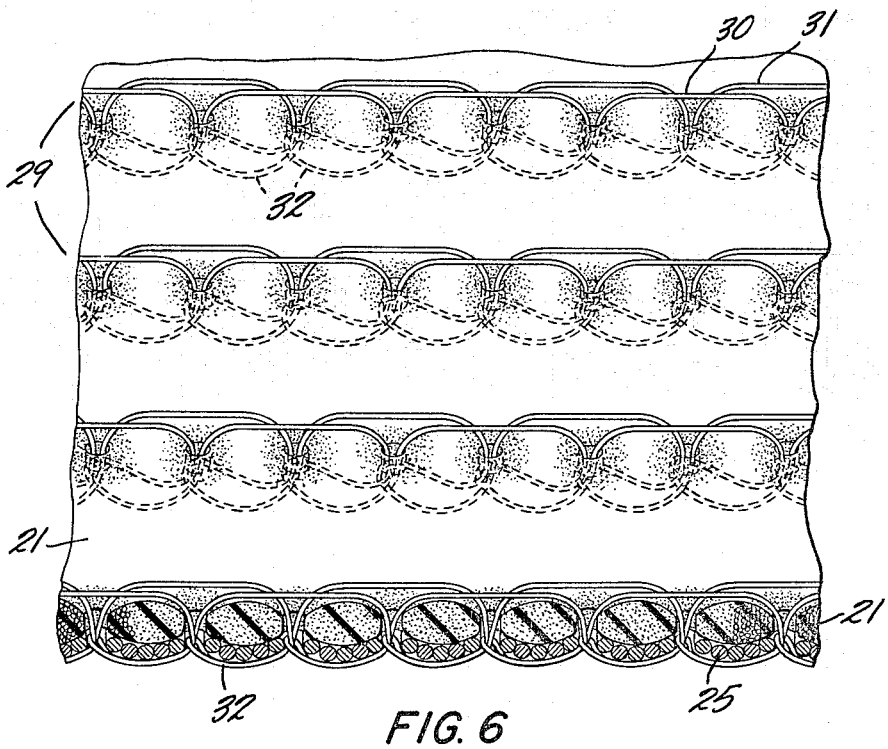
FIG. 6 illustrates the use of a double thread lock stitch as the extension-limiting yarn structure.

FIG. 6 shows an embodiment of this invention wherein the extension-limiting yarn system 29 is made up of parallel rows of double thread lock stitches. In this embodiment, the chains consist of alternating threads 30 and 31, each of which alternately pierce the foam sheet 21 to form interconnected loops 32 on the bottom of the sheet 21. The thread which does not form a loop at a particular point passes over this point, and pierces the sheet and forms a loop at the next point. In the embodiment shown, loops 32 also secure a laid in yarn 25 to the sheet 21.

Figure 7:
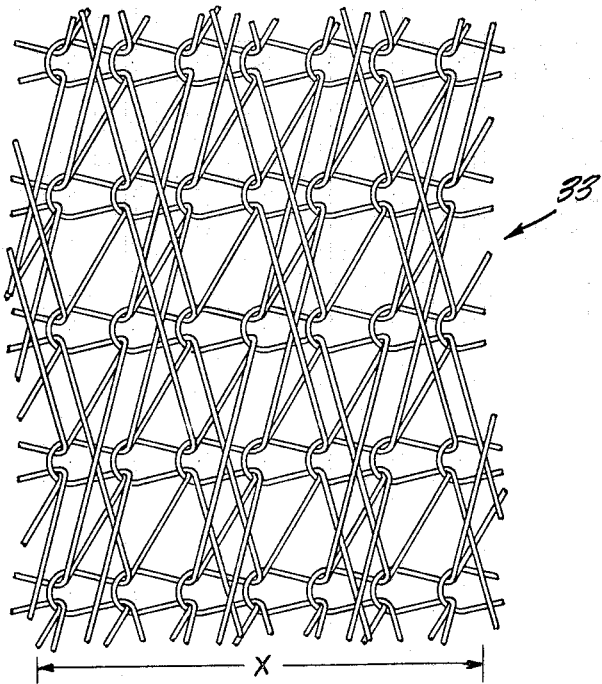
FIG. 7 and FIG. 8 illustrate the use of a compressible preformed facing fabric and the structure obtained thereby.
Figure 8:
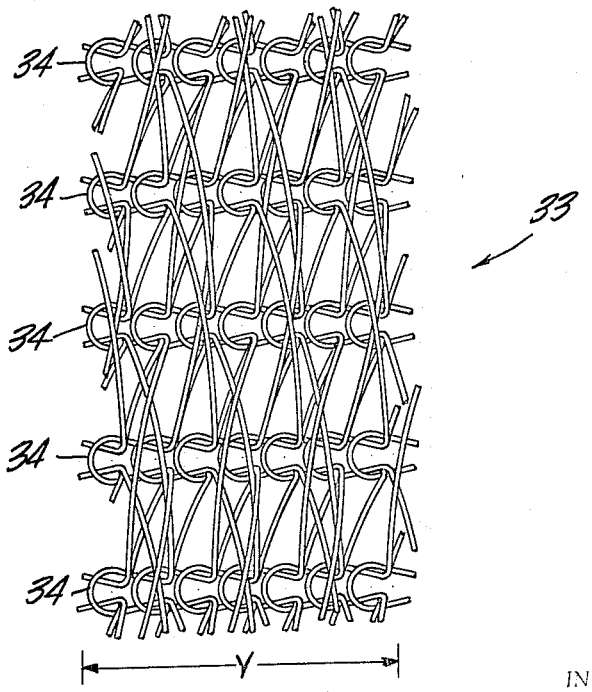

FIG. 7 and FIG. 8 illustrate in plain view the embodiment of this invention wherein a preformed tricot fabric 33 is applied to an elastomeric foam sheet 21 while the sheet 21 is in a stretched condition. FIG. 7 shows the structure of the fabric 33 in its normal relaxed condition, prior to its application to stretched sheet 21. FIG. 8 illustrates the structure of fabric 33 in its compressed condition, after its application to a stretched sheet of elastomeric foam, and the resulting fabric is then permitted to relax. In FIG. 8, the loops 34 move to overlap each other, permitting compression of the fabric without puckering. The extension-limiting yarn system and elastomeric foam sheet have been omitted for clarity. The line Y in FIG. 8 represents the same amount of preformed tricot fabric as is represented by the line X in FIG. 7. The preferred gauge of tricot fabric is 14 gauge. The resulting structure is a power stretch fabric.

A wide variety of fabrics can be made according to this invention. Referring to FIG. 3, a highly acceptable stretch flannel can be made where the foam sheet 21 is polyurethane, having a thickness of 5/64 of an inch, the laid in yarn 20 is cotton, and the thread system 22 is cotton, the laid in yarn 20 being slightly napped after thread 22 is attached to provide a flannel-like surface. Another highly acceptable fabric can be made in accordance with FIG. 4, where the foam sheet 21 is polyurethane of 5/64 of an inch, the sheet 21 is stretched about 40%, the laid in yarn 25 is a low-density cotton yarn, the reinforcing yarn 24 is a highly twisted filament 200 deniers or a spun (25 singles) nylon yarn, and the thread 22 is a 100 denier nylon yarn. Also, with reference to FIG. 5, the napped laid in yarn may be a blend of mohair and acrylic yarns, and the backing 28 may be an acetate tricot fabric. The degree of napping can also be varied to give a flannel, melton, angora, or other desired effect to the surface of the fabric.

Referring again to FIG. 5, another suitable stretch fabric may be made using a 5/64 inch thick sheet of polyurethane foam. The sheet is stretched about 40%. The laid in yarn 25 used is an acrylic yarn, 50% of the laid in yarn being 10 singles of a blend of acrylic, rayon and nylon, and 50% being 14 singles acrylic yarn. The reinforcing yarn 24 is 100 denier nylon. The thread 22 is 70 denier nylon, applied with a stitch length of 2.03 millimeters or 12.5 stitches per inch. This provides 20 stitches per inch in the relaxed fabric, and the resulting fabric will stretch 30% in the linear direction. The laid in yarn 25 is napped to provide a medium length nap on the fabric surface.

In order to demonstrate the advantages of the embodiments of FIG. 1 and FIG. 2 of this invention over the foam sheet, a number of tests were conducted in which the characteristics of a polyurethane foam sheet were compared therewith. The sample, identified as Stretch Foam Fabric A, had a structure as represented by FIG. 2, and was prepared by stretching the foam in a linear direction to the extent of 40%, and applying thereto a 100 denier nylon thread as a half tricot stitch. A stitch length of 1.5 millimeters was used, and 14 wales of loop chains per inch were applied. The sample identified as Non-Stretch Foam Fabric B, was prepared with a 5–10% normal take-up stretch in the linear direction, the thread, stitch type and stitch length being otherwise the same. The foam sheet used in all samples was Scott-foam, a polyurethane foam made by the Scott Paper Company, of 5/64 inch thickness. The results of the tests are given in the following table:

*Bursting strength with 1 inch ball*

|  | Lbs. |
|---|---|
| Plain foam | 3.4 |
| Stretch foam fabric—A | 102 |
| Non-stretch foam fabric—B | 54 |

ELASTIC RECOVERY

| | 25% of Burst Penetration | | 50% of Burst Penetration | |
|---|---|---|---|---|
| | Immediate | Delayed | Immediate | Delayed |
| | Percent Return | | Percent Return | |
| | 1″ Ball | | | |
| Plain Foam | 64 | 96 | 56 | 77 |
| Stretch—A | 49 | 70 | 33 | 53 |
| Non-Stretch—B | 27 | 71 | 23 | 46 |
| | 2″ Ball | | | |
| Plain Foam | 58 | 88 | 54 | 76 |
| Stretch—A | 53 | 78 | 51 | 69 |
| Non-Stretch—B | 55 | 81 | 20 | 57 |

RESILIENCY

| | | |
|---|---|---|
| Percent Burst Penetration | 25% | 50% |
| | 1″ Ball | |
| Plain Foam | 28 | 20 |
| Stretch—A | 31 | 18 |
| Non-Stretch—B | 20 | 19 |
| | 2″ Ball | |
| Plain Foam | 28 | 20 |
| Stretch—A | 27 | 21 |
| Non-Stretch—B | 37 | 26 |

The figures in the Elastic Recovery section of the table refer to the percentage of return observed both immediately and after a suitable period of time, i.e., about 1 hour. The tests are otherwise standard.

The tests show that the inherent elastic recovery and resiliency of the foam was not changed, but that the bursting strength increased over 30 fold.

I claim:

1. A fabric having a limited stretch in at least a longitudinal direction comprising an elastomeric foam sheet, a facing for at least one surface thereof and an extension-limiting yarn system, the yarn system being comprised of warp knitted stitches formed into parallel courses of threads which alternately form the loops of adjacent courses of loop chains on one surface of the fabric, which pierce the facing and sheet, and which then form courses on the other surface of the sheet to secure the facing to the sheet, the courses of loop chains being oriented in the longitudinal direction.

2. The fabric of claim 1 wherein the elastomeric foam sheet is polyurethane.

3. The fabric of claim 1 wherein the facing is nonwoven and comprises a yarn laid in at a substantial angle to the direction of limited stretch.

4. The fabric of claim 1 wherein the facing is nonwoven and is a yarn laid in on the upper surface of the sheet perpendicular to the direction of stretch and is secured to the sheet by the loop chains of the tricot stitched fabric.

5. A power stretch fabric comprising an elastomeric foam sheet, a facing of tricot cloth on at least one surface thereof and an extension-limiting yarn system, the yarn system being a half tricot stitch comprising parallel courses of threads which alternately form the loops of adjacent courses of loop chains on one surface of the fabric, which pierce the facing and sheet, and which then form zig-zag courses on the other surface of the sheet to secure the facing to the sheet, the tricot cloth of the facing being maintained in a compressed state by confinement within the yarn system adjacent the sheet as a result of the application of the yarn system through the facing and the sheet while the sheet was in a stretched condition.

6. The method of preparing a stretch fabric from an elastomeric foam sheet comprising the steps of stretching a continuous sheet of elastomeric foam in a linear direction, applying a facing to at least one surface of the stretched sheet, knitting an extension-limiting yarn system into the stretched sheet and over and through the facing to secure it to the foam sheet, and allowing the sheet to contract in recovery from the stretched condition, the extension-limiting yarn system comprising a plurality of closely spaced rows of thread knitted into the sheet, each row of threads being oriented in the direction which the sheet is stretched, and piercing the sheet at intervals to form rows of interconnected loops on the opposite surface of the sheet, the rows of interconnected loops being parallel to the rows on said one surface of the sheet.

7. The method of claim 6 wherein the extension-limiting yarn system is a half tricot stitch comprising threads which alternately form the loops of adjacent courses of loop chains on one surface of the sheet, pierces the sheet, and forms zig-zag courses of thread on the other surface of the sheet.

8. The method of claim 6 wherein a facing is applied to the stretched sheet by laying in yarns in a direction transverse to the direction of stretch and the facing is thereafter secured to the sheet by application of the extension-limiting yarn system to and through the laid on yarn and stretched sheet.

9. The fabric of claim 1 wherein the extension-limiting yarn system is a half tricot stitch.

10. The fabric of claim 1 wherein the extension limiting yarn system is a full tricot stitch.

References Cited by the Examiner

UNITED STATES PATENTS

| 2,225,874 | 12/1940 | Lehrman | 66—191 |
| 2,333,630 | 11/1943 | Amidon | 66—192 X |
| 2,890,579 | 6/1959 | Mauersberger | 66—192 |
| 3,144,671 | 8/1964 | Gould et al. | 139—420 X |

FOREIGN PATENTS

38/2,848   4/1963   Japan.

MERVIN STEIN, *Primary Examiner.*

DONALD W. PARKER, *Examiner.*

P. C. FAW, *Assistant Examiner.*